US011323059B2

United States Patent
Kawaguchi et al.

(10) Patent No.: US 11,323,059 B2
(45) Date of Patent: May 3, 2022

(54) POWER CONVERSION DEVICE, X-RAY IMAGE CAPTURING APPARATUS, AND MOTOR DRIVE DEVICE

(71) Applicant: Hitachi, Ltd., Tokyo (JP)

(72) Inventors: Yuki Kawaguchi, Tokyo (JP); Syoutarou Shindou, Tokyo (JP); Takayuki Masaki, Tokyo (JP); Mina Ogawa, Tokyo (JP)

(73) Assignee: FUJIFILM HEALTHCARE CORPORATION, Chiba (JP)

( * ) Notice: Subject to any disclaimer, the term of this patent is extended or adjusted under 35 U.S.C. 154(b) by 67 days.

(21) Appl. No.: 16/886,953

(22) Filed: May 29, 2020

(65) Prior Publication Data

US 2021/0184617 A1 Jun. 17, 2021

(30) Foreign Application Priority Data

Dec. 11, 2019 (JP) .............................. JP2019-223556

(51) Int. Cl.
*H02P 27/08* (2006.01)
*H02M 7/5395* (2006.01)

(52) U.S. Cl.
CPC ........ *H02P 27/085* (2013.01); *H02M 7/5395* (2013.01)

(58) Field of Classification Search
CPC ...... H02P 27/085; H02P 29/65; H02M 7/5395
See application file for complete search history.

(56) References Cited

U.S. PATENT DOCUMENTS

| 5,808,376 A * | 9/1998 | Gordon ................... H02J 9/061 307/66 |
| 9,294,009 B2 * | 3/2016 | Hattori ................ H02M 7/5387 |
| 2003/0053323 A1 * | 3/2003 | Kimura ............. H02M 7/53875 363/98 |
| 2005/0001582 A1 * | 1/2005 | Goto ................... F02N 11/0859 318/802 |
| 2005/0194925 A1 | 9/2005 | Ito et al. |

FOREIGN PATENT DOCUMENTS

JP 4158715 B2 10/2008

* cited by examiner

*Primary Examiner* — Rina I Duda
(74) *Attorney, Agent, or Firm* — Baker Botts L.L.P.

(57) ABSTRACT

A power conversion device comprising: a three-phase conversion circuit in which each of upper arm elements which are switching elements in an upper arm and each of lower arm elements which are switching elements in a lower arm are provided for each of three phases; and a switching control unit which alternately switches between an upper arm period of holding one of the upper arm elements ON and a lower arm period of holding one of the lower arm elements ON, wherein the switching control unit switches between the upper arm period and the lower arm period, based on an integrated value of power which is calculated by integrating a power pattern which is set beforehand.

10 Claims, 15 Drawing Sheets

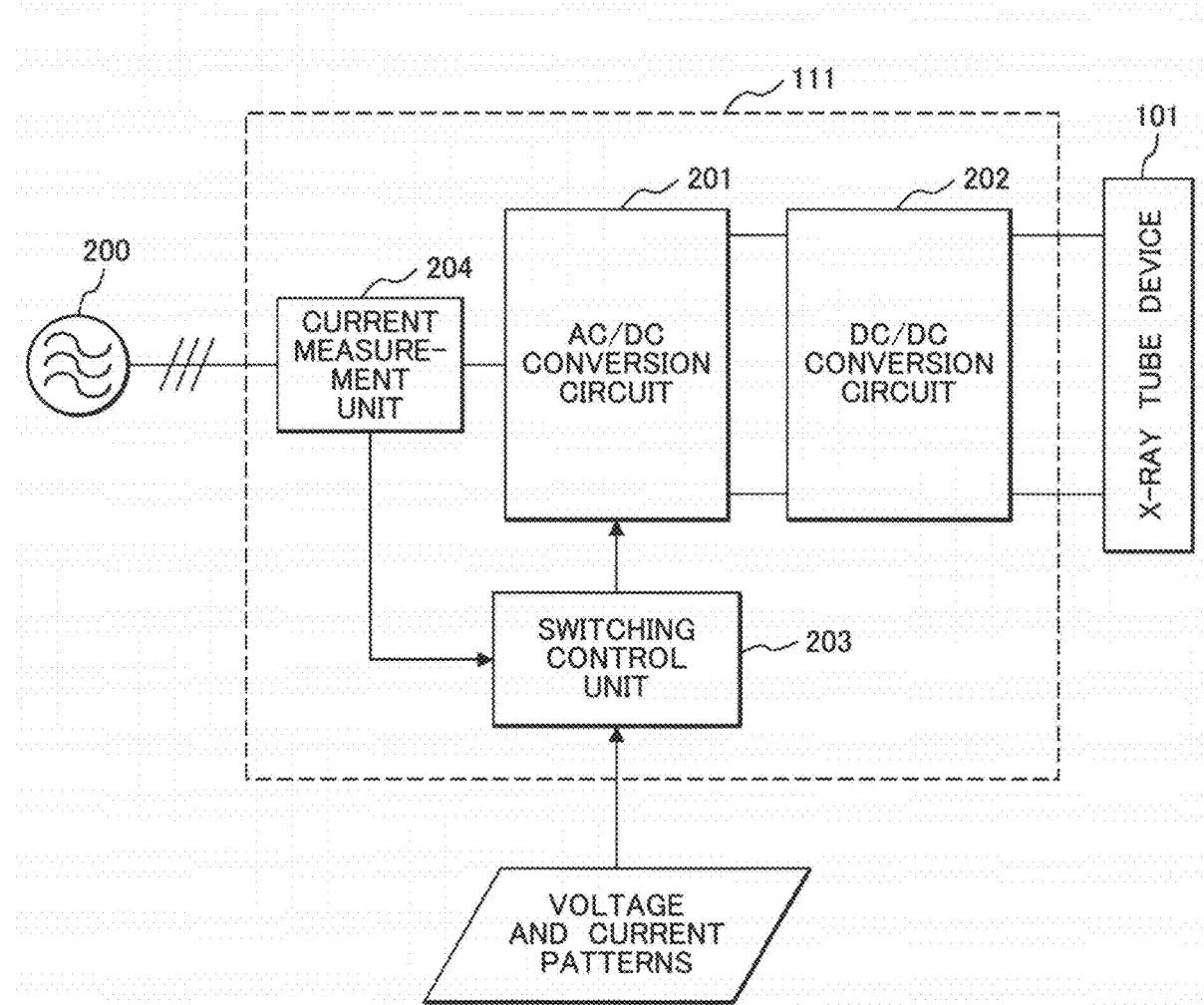

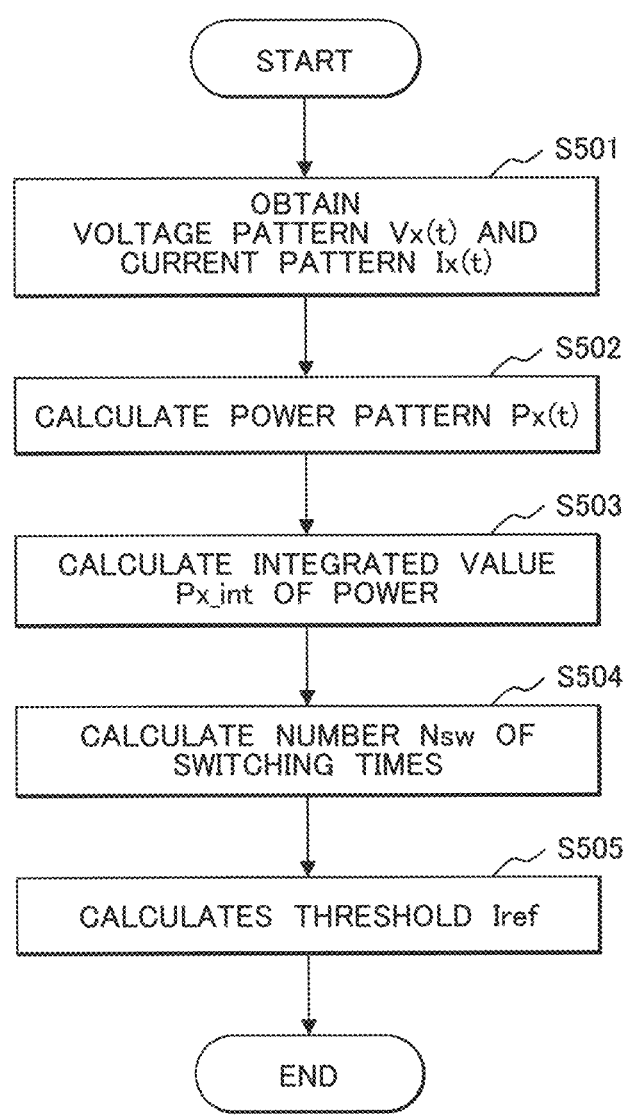

| TEMPERATURE | POWER QUANTITY |
|---|---|
| T1 | P1 |
| ⋮ | ⋮ |
| Tn | Pn |

# POWER CONVERSION DEVICE, X-RAY IMAGE CAPTURING APPARATUS, AND MOTOR DRIVE DEVICE

CLAIM OF PRIORITY

The present application claims priority from Japanese Patent Application JP 2019-223556 filed on Dec. 11, 2019, the content of which are hereby incorporated by references into this application.

BACKGROUND OF THE INVENTION

The present invention relates to a power conversion device handling three-phase power, an X-ray image capturing apparatus, and a motor drive device equipped with the same, and particularly to a technology for reducing loss in the power conversion device.

BACKGROUND ART

An X-ray image capturing apparatus to capture X-ray images of a subject and a motor drive device to drive a motor are equipped with a converter or an inverter which is a power conversion device handling three-phase power. For the power conversion device, restraining heat generation is important and a two-phase modulation scheme is used to reduce switching loss in Pulse Width Modulation (PWM) control. In the two-phase modulation scheme, the number of switching times is decreased by holding a switching element ON in either of an upper arm and a low arm at intervals of 120° for each phase, thereby reducing the switching loss.

Moreover, in Japanese Patent No. 4158715, a technology is disclosed that retrains an imbalance in heat generation between a switching element which is held ON in the two-phase modulation scheme and its counterpart switching element. Specifically, the two-phase modulation scheme is disclosed in which a period of holding a switching element ON in the upper arm and a period of holding a switching element ON in the lower arm are set approximately equal and these periods are switched from one to another periodically or take place alternately.

SUMMARY OF THE INVENTION

However, in Japanese Patent No. 4158715, no consideration is made about a case where power that is supplied to a load varies greatly or power is supplied in a non-periodic manner. That is, even if periods of holding a switching element in the upper arm and holding a switching element ON in the lower arm are set approximately equal and both the periods are switched from one another periodically, there occurs an imbalance in heat generation between the switching elements in the case where power that is supplied to the load varies greatly or power is supplied in a non-periodic manner.

Therefore, the present invention has an object to provide a power conversion device capable of reducing a difference in heat generation between multiple switching elements even when power that is supplied to the load varies greatly or power is supplied in a non-periodic manner, as well as an X-ray image capturing apparatus and a motor drive device equipped with the same.

To achieve the foregoing object, one aspect of the present invention resides in a power conversion device including a three-phase conversion circuit in which each of upper arm elements which are switching elements in an upper arm and each of lower arm elements which are switching elements in a lower arm are provided for each of three phases, and a switching control unit which alternately switches between an upper arm period of holding one of the upper arm elements ON and a lower arm period of holding one of the lower arm elements ON. The switching control unit switches between the upper arm period and the lower arm period, based on an integrated value of power which is calculated by integrating a power pattern which is set beforehand.

Another aspect of the present invention resides in an X-ray image capturing apparatus to capture X-ray images of a subject, including the above-described power conversion device.

Another aspect of the present invention resides in a motor drive device to drive a motor, including the above-described power conversion device.

According to the present invention, it is possible to provide a power conversion device enabling it to reduce a difference in heat generation between multiple switching elements even when power that is supplied to a load varies greatly or power is supplied in a non-periodic manner, as well as an X-ray image capturing apparatus and a motor drive device equipped with the same.

BRIEF DESCRIPTION OF THE DRAWINGS

FIG. 2 is a diagram depicting an example of a configuration of a power conversion device of a first embodiment;

FIG. 4A is a diagram to explain the two-phase modulation scheme for holding an upper arm element ON;

FIG. 4B is a diagram to explain the two-phase modulation scheme for holding a lower arm element ON;

FIG. 5 is a diagram illustrating an example of a processing flow of calculating a threshold in the first embodiment;

DETAILED DESCRIPTION OF THE PREFERRED EMBODIMENTS

In the following, preferred embodiments of a power conversion device, an X-ray image capturing apparatus, and a motor drive device will be described according to the accompanying drawings. Now, in the following description and the accompanying drawings, as for components having identical functions and structures, duplicative descriptions are omitted by assigning them identical reference designators.

First Embodiment

Figure 1:
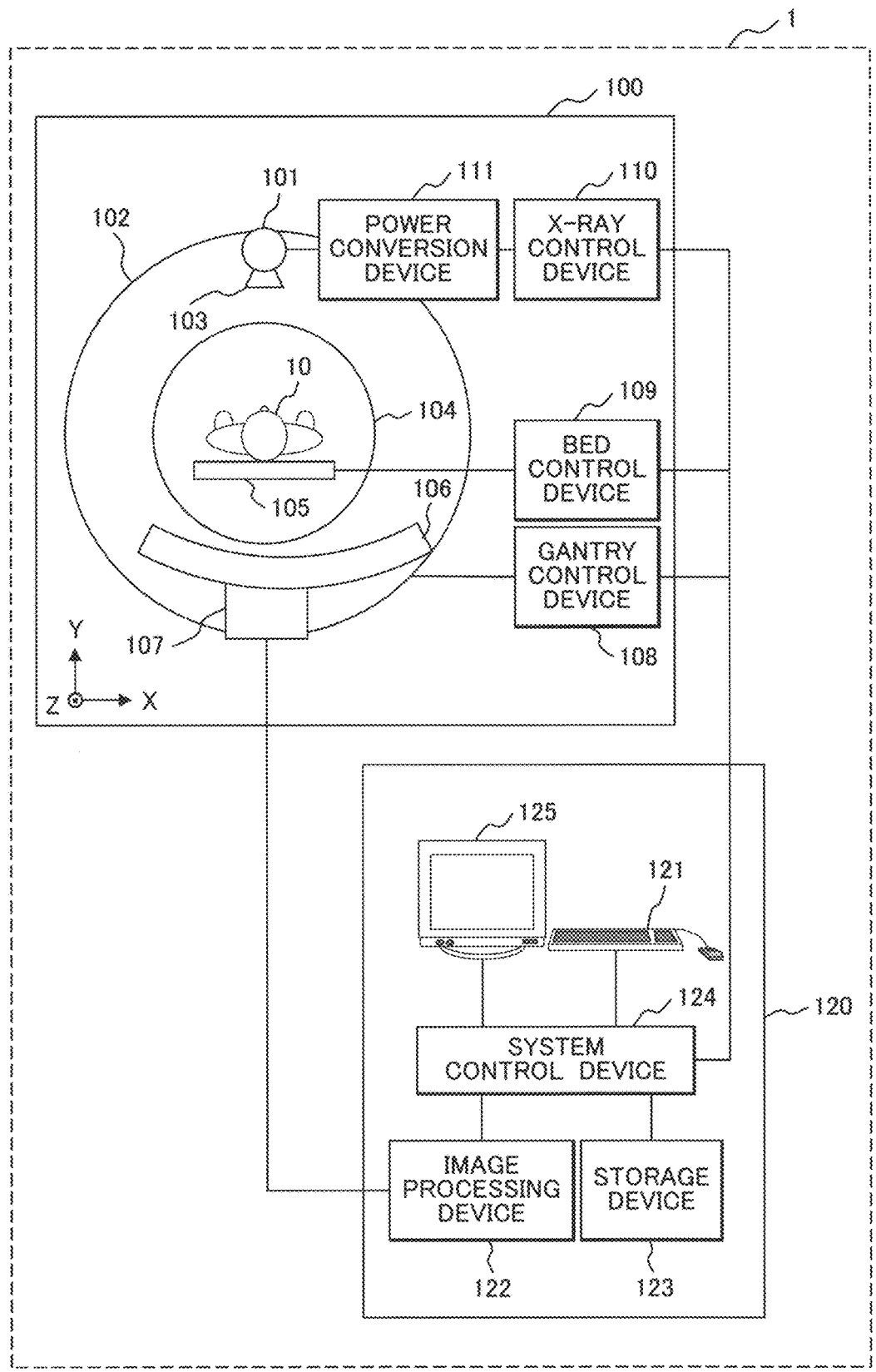
FIG. 1 is a diagram depicting an overall structure of an X-ray CT apparatus which is an example of an X-ray image capturing apparatus.

An overall structure of an X-ray Computed Tomography (CT) apparatus which is an example of an X-ray image capturing apparatus will be described with FIG. 1. As depicted in FIG. 1, the X-ray CT apparatus 1 includes a scanning gantry part 100 and an operating unit 120.

The scanning gantry part 100 includes an X-ray tube device 101, a rotating ring 102, a collimator 103, an X-ray detector 106, a data acquisition device 107, a bed device 105, a gantry control device 108, a bed control device 109, and X-ray control device 110, and a power conversion device 111. The X-ray tube device 101 is a device irradiating X-rays onto a subject 10 rested on the bed device 105. The collimator 103 is a device confining an X-ray irradiation range. The rotating ring 102 has a bore 104 for the subject 10 rested on the bed device 105 to enter and the X-ray tube device 101 and the X-ray detector 106, is internally equipped with the X-ray tube device 101 and the X-ray detector 106, and rotates the X-ray tube device 101 and the X-ray detector 106 around the subject 10.

The X-ray detector 106 is a device placed opposite to the X-ray tube device 101 and measuring a spatial distribution of transmission X-rays by detecting X-rays that pass through the subject 10. Detection elements of the X-ray detector 106 may be arrayed in one dimension in a rotating direction of the rotating ring 102 in one case and may be arranged in two dimensions in the rotating direction of the rotating ring 102 and a rotation axial direction in another case. The data acquisition device 107 is a device acquiring quantities of X-rays detected by the X-ray detector 106 as digital data.

The gantry control device 108 is a device controlling rotation and inclination of the rotating ring 102. The bed control device 109 is a device controlling up and down, back and forth, and left and right movements of the bed device 105. The X-ray control device 110 is a device controlling output of the power conversion device 111. The power conversion device 111 is a device generating, inter alia, a tube voltage that is a high voltage to be applied to the X-ray tube device 101. Details of the power conversion device 111 will be described later by way of FIG. 2.

The operating unit 120 includes an input device 121, an image processing device 122, a display device 125, a storage device 123, and a system control device 124. The input device 121 is a device for inputting the name of a subject 10, date and time of an inspection, imaging conditions, etc. and specifically may be a keyboard and a pointing device or a touch panel among others. The image processing device 122 is a device performing computational processing on measurement data which is transmitted from the data acquisition device 107 to reconstruct CT images. The display device 125 is a device displaying CT images reconstructed by the image processing device 122 and other data and specifically may be, inter alia, a crystal display. The storage device 123 is a device storing, inter alia, data acquired by the data acquisition device 107 and CT images reconstructed by the image processing device 122 and specifically may be a Hard Disk Drive (HDD), a Solid State Drive (SSD), or others. The system control device 124 is a device controlling all the components of the apparatus and specifically may be, inter alia, a Central Processing Unit (CPU).

Based on imaging conditions input from the input device 121, the power conversion device 111 generates a tube voltage and a tube current to be applied to the X-ray tube device 101, so that X-rays in accordance with the imaging conditions are irradiated from the X-ray tube device 101 onto the subject 10. The detector 106 detects X-rays that pass through the subject 10 after being irradiated from the X-ray tube device 101 with a great number of X-ray detection elements and measures a distribution of transmission X-rays. The rotating ring 102 is controlled by the gantry control device 108 to rotate according to the imaging conditions, inter alia, particularly, rotating speed input through the input device 121. The bed device 105 is controlled by the bed control device 109 to move according to the imaging conditions, inter alia, particularly, a helical pitch having been input through the input device 121.

By iteration of X-ray irradiation from the X-ray tube device 101 and X-ray measurement by the X-ray detector 106 along with rotation of the rotating ring 102, projection data from various angles is obtained. Projection data is associated with a view representing each angle as well as a channel (ch) number and a row number, a combination of which is a detection element number of each detection element of the X-ray detector 106. Projection data obtained from various angles is transmitted to the image processing device 122. The image processing device 122 reconstructs CT images by performing back projection processing on the transmitted projection data obtained from various angles. The reconstructed CT images are displayed on the display device 125 and used for diagnosis by a doctor.

An example of the power conversion device 111 is described with FIG. 2. The power conversion device 111 includes an AC-DC conversion circuit 201, a DC-DC conversion circuit 202, a switching control unit 203, and a current measurement unit 204.

The AC-DC conversion circuit 201 is a circuit converting three-phase power which is supplied from a utility three-phase power supply 200 to direct current (DC) power. To an output end of the AC-DC conversion circuit 201, the DC-DC conversion circuit 202 is connected. Details of the AC-DC conversion circuit 201 will be described later by way of FIG. 3A.

The DC-DC conversion circuit 202 is a circuit converting the DC power which is output from the AC-DC conversion circuit 201 to alternating current (AC) power and, after that, further converting the AC power to DC power. To an output end of the DC-DC conversion circuit 202, the X-ray tube device 101 which is a load of the power conversion device 111 is connected. Additionally, DC power that is output from the AC-DC conversion circuit 201 which is not placed on the rotating ring 102 is supplied to the DC-DC conversion circuit 202 which is placed on the rotating ring 102 via a slip ring or the like. Details of the DC-DC conversion circuit 202 will be described later by way of FIG. 3B.

The current measurement unit 204 is a circuit measuring an input current which is a current supplied from the three-phase power supply 200 to the AC-DC conversion circuit 201. Values of the input current measured by the current measurement unit 204 are transmitted to the switching control unit 203.

The switching control unit 203 is a device which controls switching elements present in the AC-DC conversion circuit 201, based on a power pattern which is calculated from a voltage pattern and a current pattern to be supplied to the X-ray tube device 101 and has a computing element such as, e.g., a Central Processing Unit (CPU). Also, the switching control unit 203 uses current values which are transmitted from the current measurement unit 204, as required, to control the switching elements. Details of operation of the switching control unit 203 will be described later by way of FIG. 6 among others.

Figure 3A:
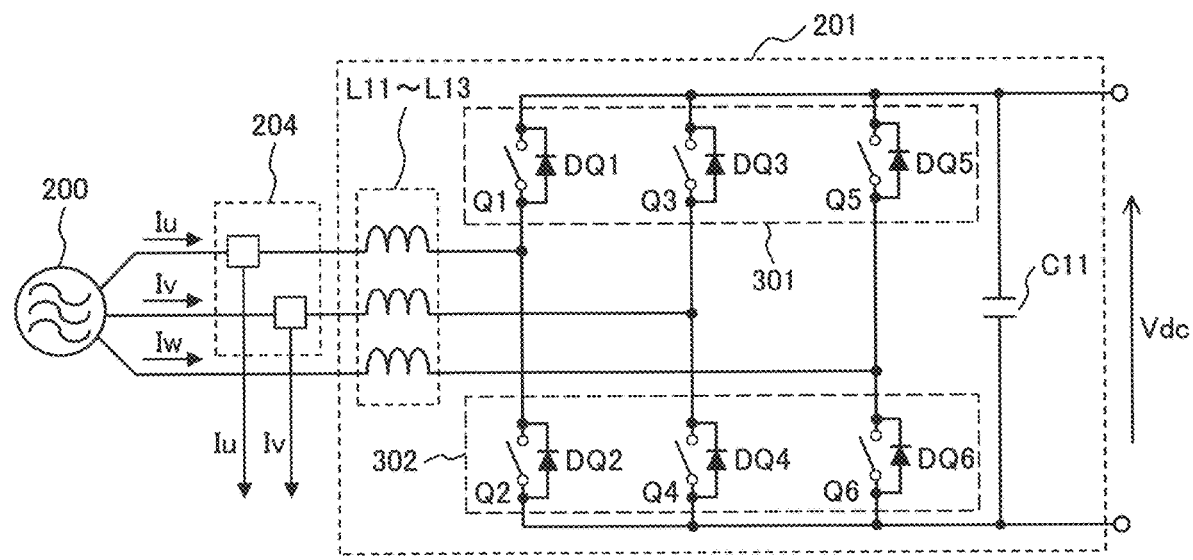
FIG. 3A is a diagram depicting an example of an AC-DC conversion circuit in the first embodiment.

An example of the AC-DC conversion circuit 201 will be described with FIG. 3A. The AC-DC conversion circuit 201 includes reactors L11 to L13, switching elements Q1 to Q6, antiparallel diodes DQ1 to DQ6, and a smoothing capacitor C11 and outputs a DC voltage Vdc. Additionally, the current measurement unit 204 which measures currents supplied to the AC-DC conversion circuit 201 may measure currents of each of three phases or the currents of any two phases of the three phases, as depicted in FIG. 3A. If currents of two phases are measured, the remaining one-phase current is calculated from the current values of the two phases.

The reactors L11 to L13 are coils suppressing a harmonic current included in the currents supplied from each phase of the three-phase power supply 200. The switching elements Q1 to Q6 are switches which are ON/OFF controlled by the switching control unit 203 and semiconductor devices such as, e.g., Insulated Gate Bipolar Transistors (IGBTs) or Metal-Oxide-Semiconductor Field-Effect Transistors (MOSFETs). Among the three-phase currents, a U-phase current is input to a connection point between the switching elements Q1 and Q2, a V-phase current is input to a connection point between the switching elements Q3 and Q4, and a W-phase current is input to a connection point between the switching elements Q5 and Q6, respectively. The antiparallel diodes DQ1 to DQ6 are diodes which are reverse polarity connected in parallel with each of the switching elements Q1 to Q6 and protect the switching elements Q1 to Q6 from reverse current. The smoothing capacitor C11 is a capacitor suppressing a ripple in output voltage.

Additionally, the switching elements Q1, Q3, Q5 and antiparallel diodes DQ1, DQ3, DQ5 are termed as an upper arm 301, and the switching elements Q2, Q4, Q6 and antiparallel diodes DQ2, DQ4, DQ6 are termed as a lower arm 302. Moreover, the switching elements Q1, Q3, Q5 included in the upper arm 301 are termed as upper arm elements, and the switching elements Q2, Q4, Q6 included in the lower arm 302 are termed as lower arm elements. In addition, when an upper arm element of a phase of the three phases is ON, a lower arm element of the same phase is OFF. For example, if the switching element Q1 is ON, the switching element Q2 is OFF; and if the switching element Q4 is ON, the switching element Q3 is OFF. That is, the AC-DC conversion circuit 201 is a three-phase conversion circuit in which each of the upper arm elements and each of the lower arm elements are provided for each of the three phases.

Figure 3B:
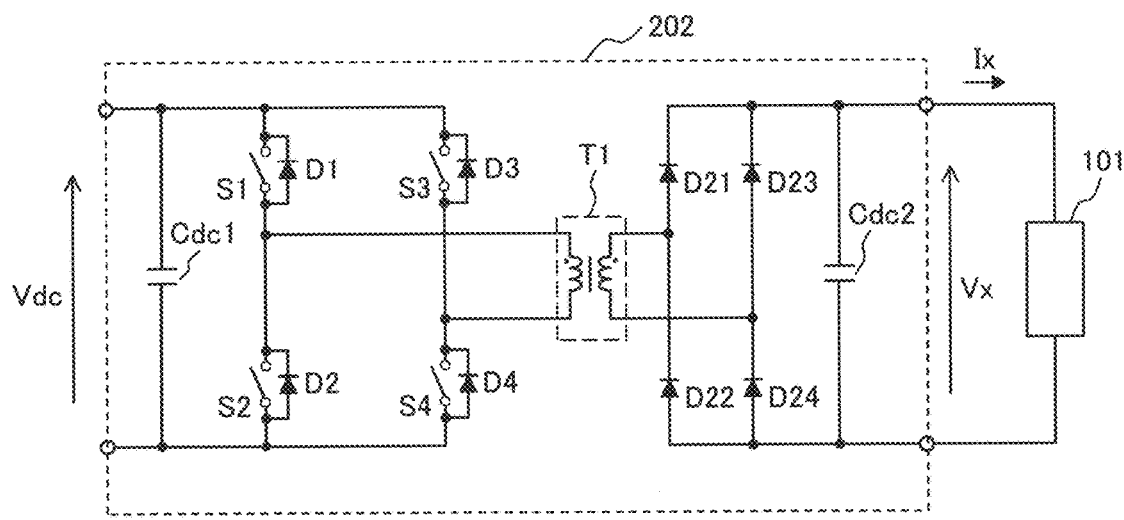
FIG. 3B is a diagram depicting an example of a DC-DC conversion circuit in the first embodiment.

An example of the DC-DC conversion circuit 202 is described with FIG. 3B. The DC-DC conversion circuit 202 includes a smoothing capacitor Cdc1, switching elements S1 to S4, antiparallel diodes D1 to D4, a high-frequency transformer T1, rectifying diodes D21 to D24, and a smoothing capacitor Cdc2. The DC-DC conversion circuit 202 to which the DC voltage Vdc is input outputs a tube voltage Vx and a tube current Ix to the X-ray tube device 101.

The smoothing capacitor Cdc1 is a capacitor smoothing a high-frequency voltage included in the DC voltage Vdc which is supplied via the slip ring or the like. The switching elements S1 to S4 are switches which are ON/OFF controlled and constitute a full bridge circuit together with the antiparallel diodes D1 to D4. The antiparallel diodes antiparallel diodes D1 to D4 are diodes which are reverse polarity connected in parallel with each of the switching elements S1 to S4. The high-frequency transformer T1 is a transformer transforming an AC voltage which is output from the full bridge circuit. The rectifying diodes D21 to D24 are diodes rectifying the AC voltage which is output from the high-frequency transformer T1. The smoothing capacitor Cdc2 is a capacitor suppressing a ripple in the tube voltage Vx.

Figure 4A:
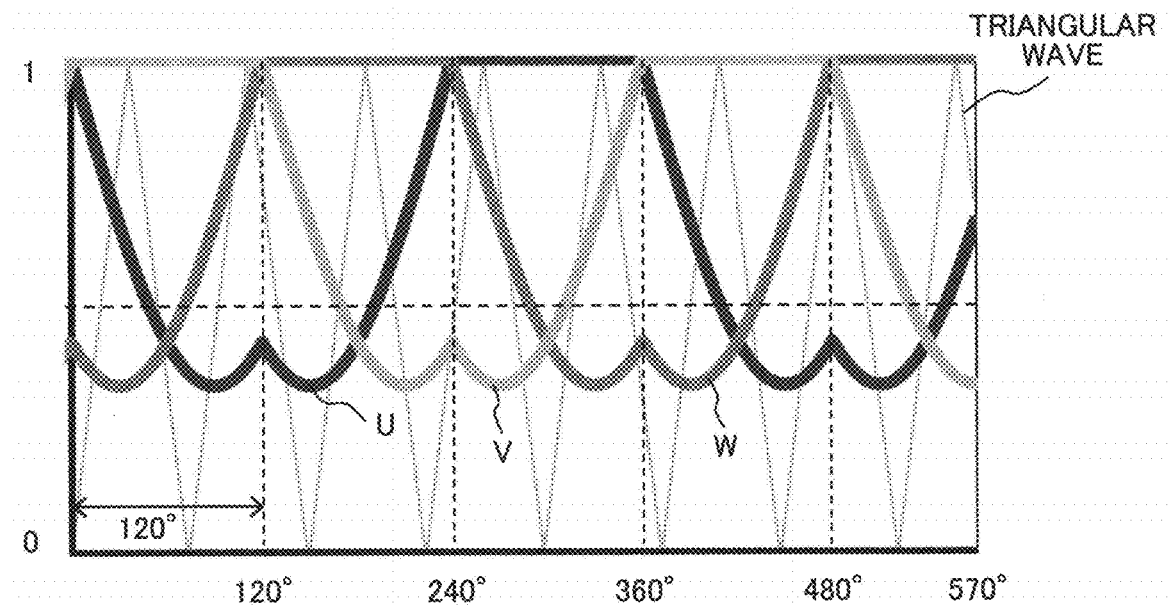

The two-phase modulation scheme for holding an upper arm element ON is described with FIG. 4A. In FIG. 4A, a triangular wave to produce a pulse width modulation output and modulated waves for each of U-phase, V-phase, and W-phase are presented. Each of the modulated waves for each of U-phase, V-phase, and W-phase is held to 1 which is the maximum amplitude of the triangular wave at intervals of 120°, and when each modulated wave is larger than the triangular wave, an upper arm element, e.g., one of the switching elements Q1, Q3, Q5 in FIG. 3A is turned ON. That is, in the two-phase modulation scheme illustrated in FIG. 4A, an upper arm element is held ON and a lower arm element is held OFF at intervals of 120°, and therefore, switching loss can be reduced by about two-thirds in comparison with a three-phase modulation scheme in which an upper arm element and a lower arm element operate to be switched ON/OFF constantly.

Figure 4B:
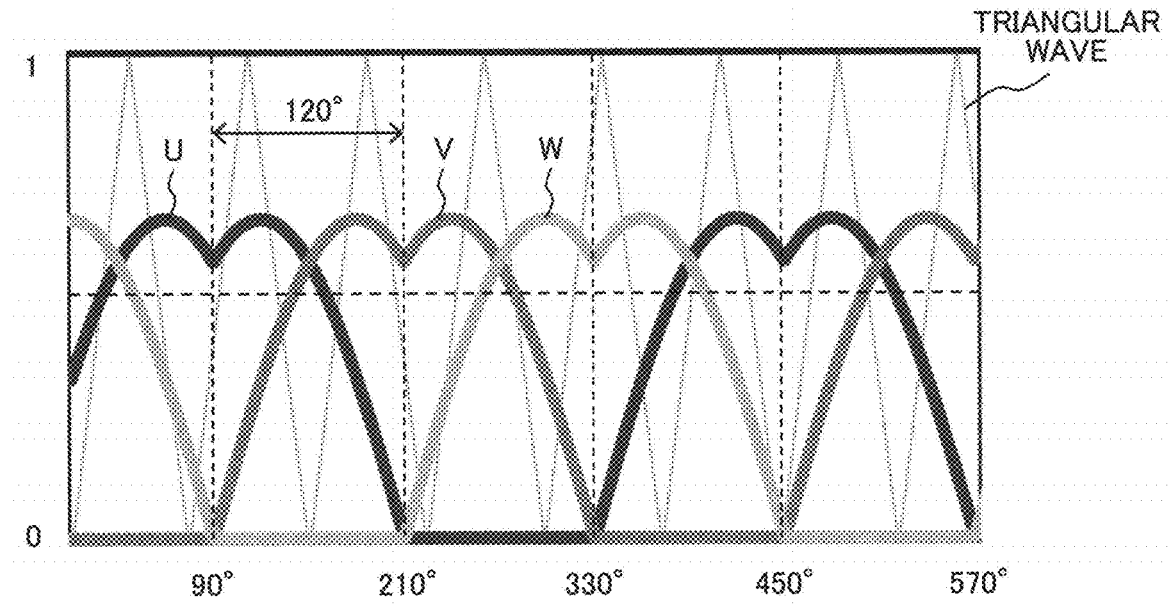

In FIG. 4B, the triangular wave and modulated waves for each of U-phase, V-phase, and W-phase are presented in a case of the two-phase modulation scheme for holding a lower arm element ON. Each of the modulated waves for each of U-phase, V-phase, and W-phase is held to 0 which is the minimum amplitude of the triangular wave at intervals of 120°, and when each modulated wave is smaller than the triangular wave, a lower arm element, e.g., one of the switching elements Q2, Q4, Q6 in FIG. 3A is turned ON. That is, in the two-phase modulation scheme illustrated in FIG. 4B, a lower arm element is held ON and an upper arm element is held OFF at intervals of 120°, and therefore, switching loss can be reduced as is the case with FIG. 4A in comparison with the three-phase modulation scheme.

Because an upper arm element and a lower arm element, while being held ON, generate heat depending on power which is supplied to the load of the power conversion device 111, holding either the upper arm element or the lower arm element ON gives rise of imbalance in heat generation. Such imbalance in heat generation is restrained by setting an upper arm period of holding an upper arm element ON and a lower arm period of holding a lower arm element ON approximately equal and switching between the periods periodically.

Nevertheless, the above is not true for a case where power that is supplied to the load varies greatly or power is supplied in a non-periodic manner. That is, in some cases, a large difference occurs between power which is supplied to an upper arm element for an upper arm period and power which is supplied to a lower arm element for a lower arm period, even if the upper and lower arm periods are set approximately equal. Therefore, in the present embodiment, the switching control unit 203 integrates a power pattern which is set beforehand, and based on an integrated value of power which is thus calculated, switching is performed between upper and lower arm periods; thus, a difference in heat generation between upper and lower arm elements is reduced. More specifically, a threshold is calculated beforehand so that a difference between a power quantity which is supplied to an upper arm element for an upper arm period depending on the integrated value of power and a power quantity which is supplied to a lower arm element for a lower arm period depending on the integrated value of power is equal to or less than a predefined value. When the current that is measured by the current measurement unit 204 exceeds that threshold, switching is performed between upper and lower arm periods. It is preferable that the predefined value is smaller and it is the most preferable that the predefined value is zero.

An example of a processing flow of calculating a threshold will be described with FIG. 5.

(S501)

The switching control unit 203 obtains a voltage pattern Vx(t) and a current pattern Ix(t) to be supplied to the X-ray tube device 101. For example, based on a tube voltage, a tube current, and imaging mode sequence information included in imaging conditions which are input via the input device 121, the voltage pattern Vx(t) and the current pattern Ix(t) are calculated which are temporal change patterns of voltage and current that are supplied to the X-ray tube device 101 which is the load.

(S502)

The switching control unit 203 calculates a power pattern Px(t), using the voltage pattern Vx(t) and the current pattern Ix(t) obtained at S501. To calculate the power pattern Px(t), for example, an equation below is used.

$$Px(t)=Vx(t) \times Ix(t) \quad (1)$$

(S503)

The switching control unit 203 calculates an integrated value Px_int of power during an operating period, using the power pattern Px(t) calculated at S502. To calculate the integrated value Px_int of power, for example, an equation below is used.

$$Px\_int = \int Px(t) \cdot dt \quad (2)$$

S504

The switching control unit 203 calculates the number Nsw of switching times which is the number of times of switching between upper and lower arm periods, using the integrated value Px_int of power calculated at S503. To calculate the number Nsw of switching times, for example, an equation below is used.

$$Nsw = 2 \cdot \text{RoundUp}(Px\_int/Px\_max) \quad (3)$$

where RoundUp( ) is an operator to round up decimals and Px_max is a maximum value of power that can be supplied to the switching elements. A value of Px_max is determined by, inter alia, the rated power of the switching elements and the cooling amount of a cooler or coolers which are installed in the AC-DC conversion circuit 201.

According to equation (3), the number Nsw of switching times is set to an even number. Additionally, noise that is generated from the AC-DC conversion circuit 201 upon switching between upper and lower arm periods may has an adverse effect on data measured in the X-ray CT apparatus 1, and it is desirable that the number Nsw of switching times is smaller. That is, the number Nsw of switching times should be set to an even number, not limited to that calculated by equation (3).

(S505)

The switching control unit 203 calculates a threshold Px_ref of power to be supplied to the load, using the integrated value Px_int of power calculated at S503 and the number Nsw of switching times calculated at S504. To calculate the threshold Px_ref, for example, an equation below is used.

$$Px\_ref = Px\_int/Nsw \quad (4)$$

The switching control unit 203 further calculates a threshold Iref regarding the input current which is measured by the current measurement unit 204, using the threshold Px_ref of power. To calculate the threshold Iref, for example, an equation below is used.

$$Iref = Px\_ref/Vac \quad (5)$$

where Vac is an effective value of a line voltage of the three-phase power supply 200.

Through the above processing flow, thresholds such as the threshold Px_ref of power and the threshold Iref regarding the input current are calculated. Additionally, a computing element other than the switching control unit 203, for example, the X-ray control device 110 or the system control device 124 may execute calculation of the thresholds.

Figure 6:
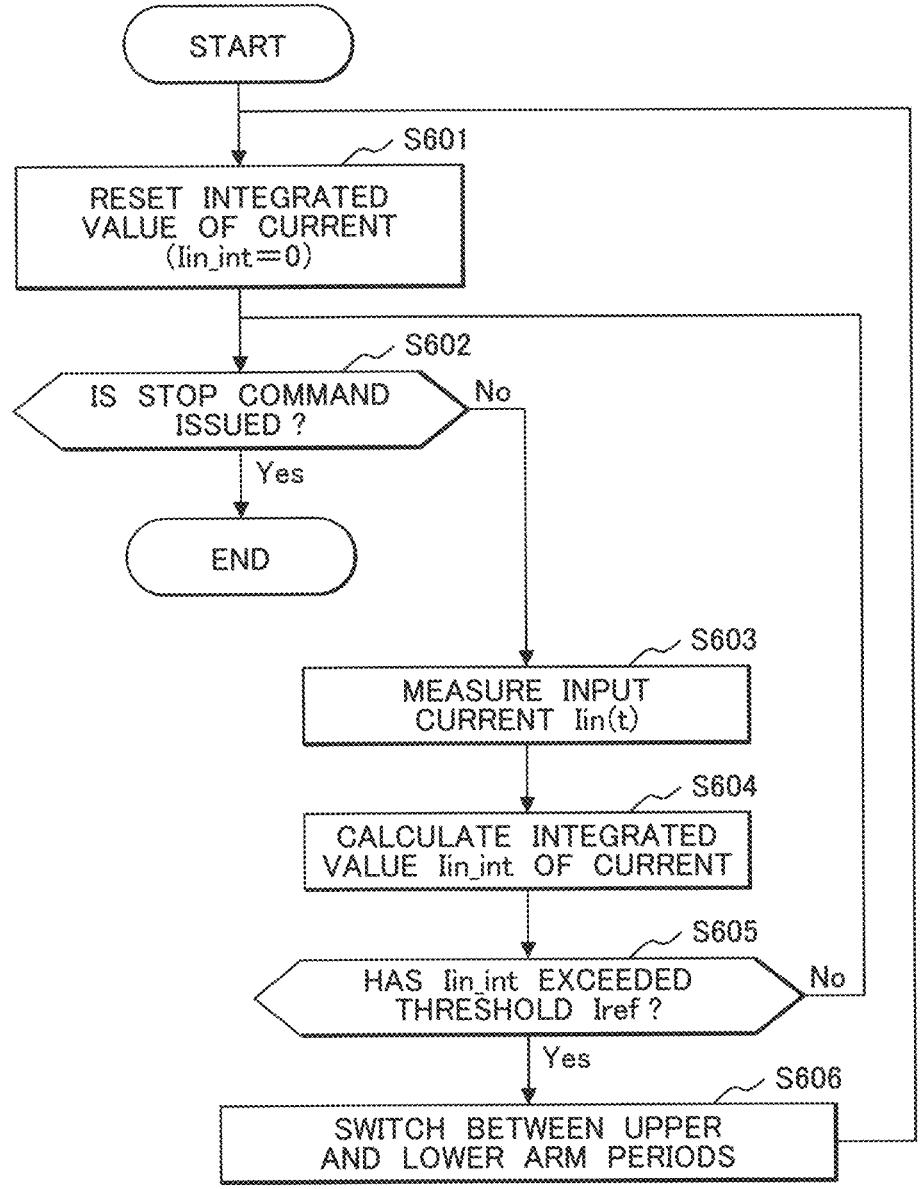
FIG. 6 is a diagram illustrating an example of an operation flow of the power conversion device of the first embodiment.

An example of an operation flow of the power conversion device 111 of the present embodiment is described with FIG. 6. Now, in FIG. 6, switching between upper and lower arm periods is performed, based on the threshold Iref regarding the input current.

(S601)

The switching control unit 203 reset an integrated value of current; that is, it initializes a value of Iin_int which is the integrated value of current to 0.

(S602)

The switching control unit 203 decides whether or not a stop command is issued. If the stop command is issued, the processing flow terminates; if not, the processing proceeds to S603. The stop command is issued upon expiry of the operating period of the power conversion device 111 or when an interrupt command has issued from outside.

(S603)

The current measurement unit 204 measures the input current Iin(t), i.e., the current which is input from the three-phase power supply 200 to the AC-DC conversion circuit 201. Additionally, the input current Iin(t) is the current of at least one phase of the U, V, and W phases. Measured values of the input current Iin(t) are transmitted to the switching control unit 203.

(S604)

The switching control unit 203 integrates the input current Iin(t) and calculates an integrated value Iin_int of current. The integrated value Iin_int of current is calculated by integrating values of the input current Iin(t) which have been measured after the reset of the integrated value of current at S601 until this step.

(S605)

The switching control unit 203 decides whether or not the integrated value Iin_int of current has exceeded the threshold Iref. If the integrated value Iin_int of current has exceeded the threshold Iref, the processing proceeds to S606; if not, the processing returns to S602.

(S606)

The switching control unit 203 switches between upper and lower arm periods. That is, if an upper arm period is ongoing, it is switched to a lower arm period; if a lower arm period is ongoing, it is switched to an upper arm period. After switching is performed between upper and lower arm periods, the processing returns to S601.

Through the processing flow described above, a difference between power which is supplied to an upper arm element for an upper arm period and power which is supplied to a lower arm element for a lower arm period is reduced even when power that is supplied to the load varies greatly or power is supplied in a non-periodic manner; therefore, it is possible to restrain an imbalance in heat generation.

Figure 7:
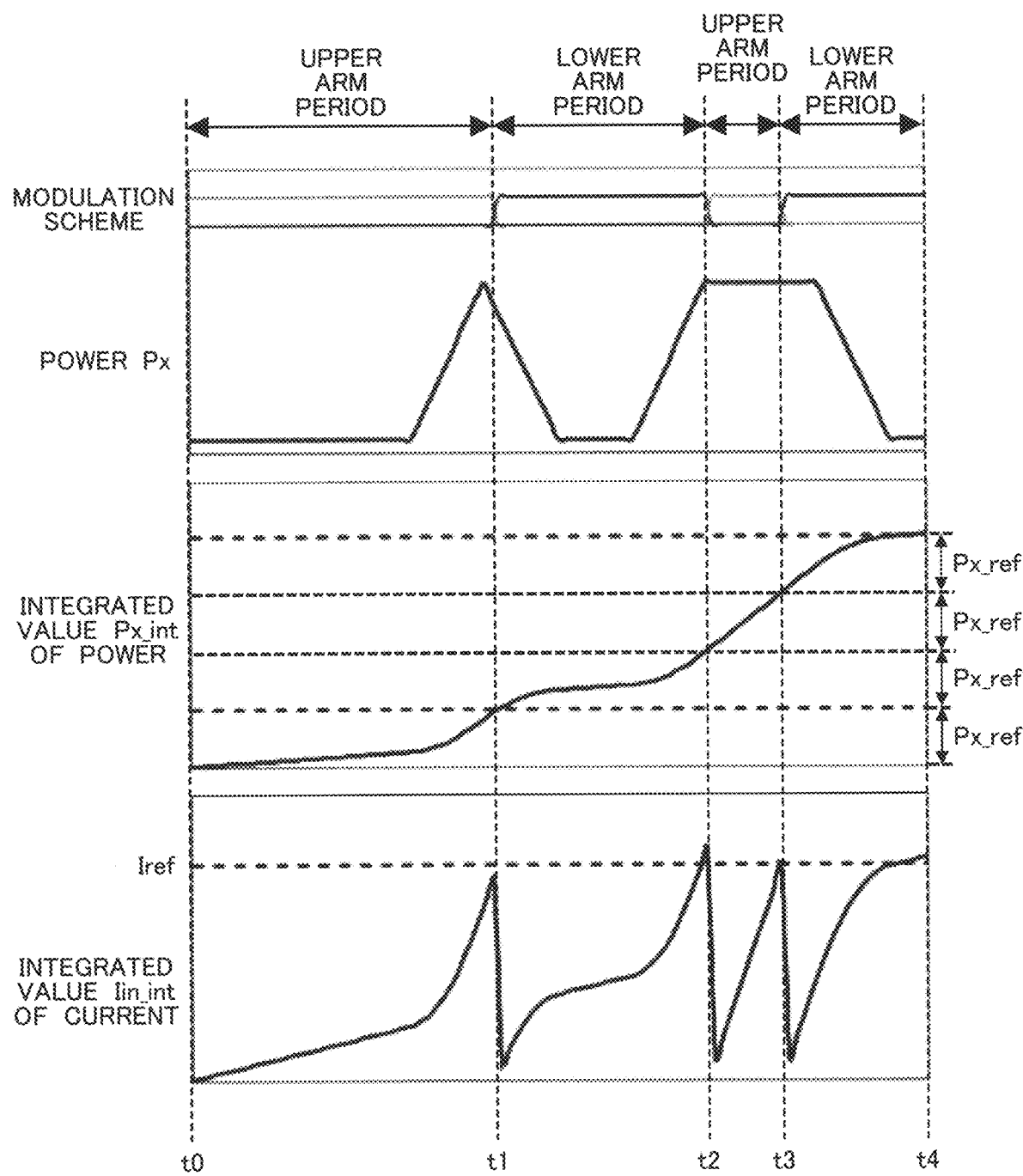
FIG. 7 is a diagram to provide a supplementary explanation of operation of the power conversion device of the first embodiment.

A supplementary explanation of operation of the power conversion device 111 of the present embodiment is provided with FIG. 7. In FIG. 7, the waveforms changing over time of the power Px of S502, the integrated value Px_int of power of S503, and the integrated value Iin_int of current of S604 when switching between upper and lower arm periods by the threshold Iref is performed four times are presented. The upper arm periods are a period from t0 to t1 and a period from t2 to t3, and the lower arm periods are a period from t1 to t2 and a period from t3 to t4. Although both the periods are unequal, the integrated values of current Iin_int that is supplied to a switching element during both the periods are virtually equal to the threshold Iref. In addition, because the line voltage Vac of the three-phase power supply 200 is virtually constant, power which is supplied to an upper arm element for an upper arm period and power which is supplied to a lower arm element for a lower arm period are virtually equal, and a difference in heat generation between upper and lower arm elements can be reduced.

Figure 8:
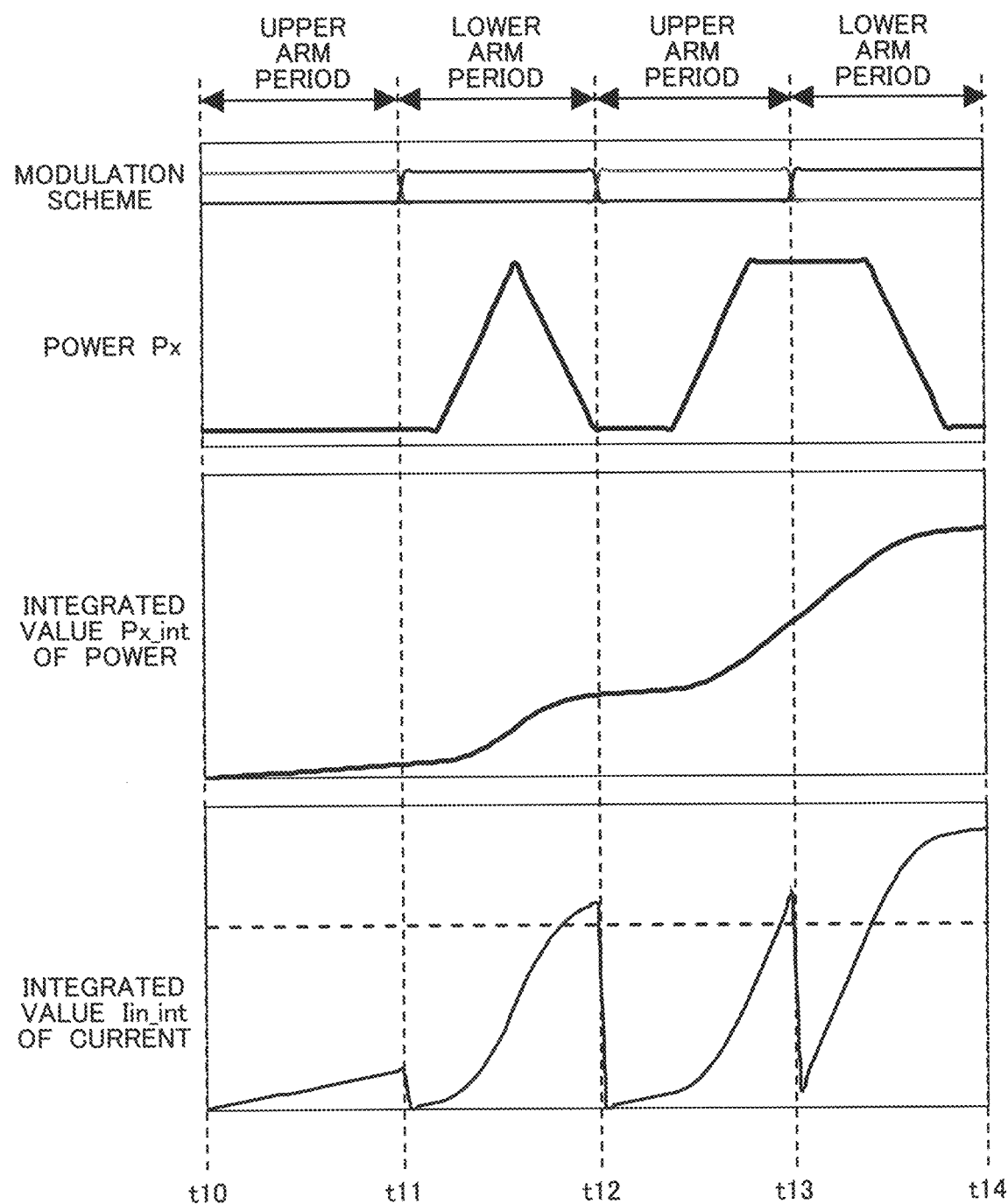
FIG. 8 is a diagram to provide a supplementary explanation of operation of a power conversion device of a comparison example.

A supplementary explanation of operation of a power conversion device of a comparison example is provided with FIG. 8. In FIG. 8, the waveforms changing over time of power Px and an integrated value Px_int of power which are the same as in FIG. 7 and an integrated value Iin_int of current when switching between upper and lower arm periods which are set approximately equal is performed periodically are presented. The upper arm periods are a period from t10 to t11 and a period from t12 to t13, and the lower arm periods are a period from t11 to t12 and a period from t13 to t14. Although both the periods are approximately equal, the integrated values of current Iin_int that is supplied to a switching element are unequal. Consequently, because the line voltage Vac of the three-phase power supply 200 is virtually constant, power which is supplied to an upper arm element for an upper arm period and power which is supplied to a lower arm element for a lower arm period are also unequal, and a difference in heat generation occurs between upper and lower arm elements.

Figures 9, 10:
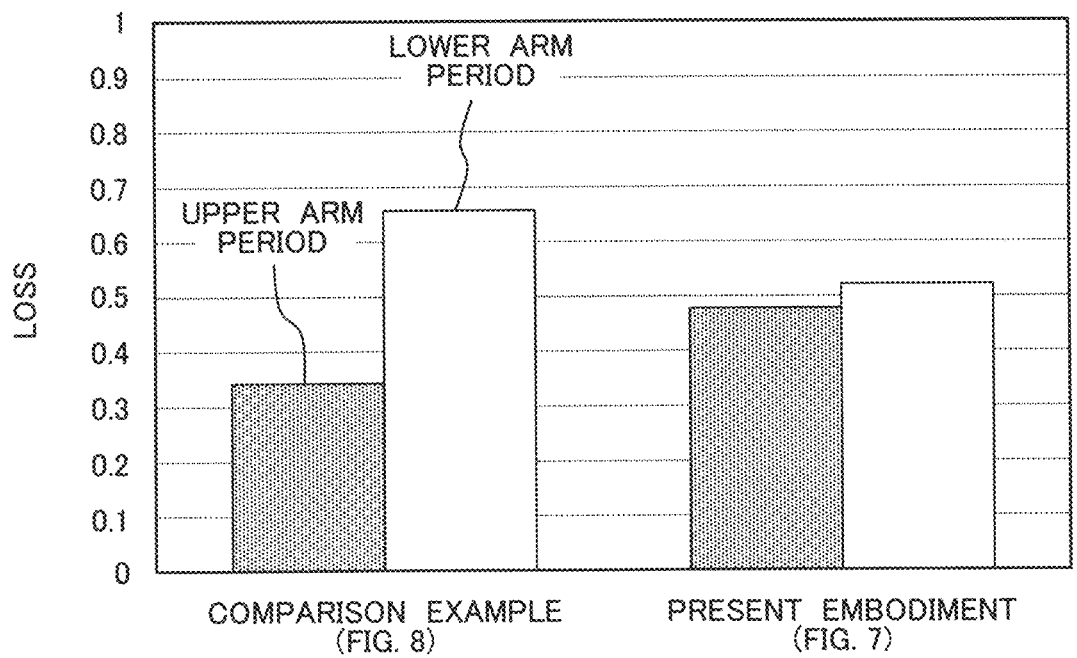
FIG. 9 is a diagram to compare the power conversion device of the first embodiment with that of the comparison example.
FIG. 10 is a diagram representing an example of a relationship between temperatures of power quantities.

Comparison between the comparison example in FIG. 8 and the present embodiment in FIG. 7 is made with FIG. 9. In FIG. 9, loss occurring in switching elements in the upper and lower arm periods is presented. The difference in loss between both the periods is small for the present embodiment in FIG. 7, whereas it is large for the comparison example in FIG. 8. That is, the present embodiment makes it possible to reduce the difference in heat generation between upper and lower arm elements. In addition, reduction in the difference in heat generation between the switching elements makes it possible to downsize the cooler or coolers which are installed in the AC-DC conversion circuit 201. When the predefined value which is used for calculating the threshold is zero, the same cooler can be used for both the upper and lower arm elements.

Additionally, instead of the integrated value of the input current to the AC-DC conversion circuit 201, an integrated value of output current from the AC-DC conversion circuit 201 may be compared with the threshold, and switching between upper and lower arm periods may be performed. The output current from the AC-DC conversion circuit 201 is measured by a current measurement unit which is a circuit disposed at an output terminal of the AC-DC conversion circuit 201 to measure the output current. To calculate the integrated value of current to be compared with the threshold, for example, an equation below is used.

$$Iref = Px\_ref / Vdc \qquad (6)$$

where Vdc is a value of a DC voltage which is output by the AC-DC conversion circuit 201.

In addition, instead of measuring the input current and the output current, the temperatures of the upper and lower arm elements may be measured and measured temperature values may be converted to power quantities which are supplied to the upper and lower arm elements. The temperatures of the upper and lower arm elements are measured by temperature measurement units which are disposed on the respective elements. To convert temperature values to power quantities, a table which is, for example, presented in FIG. 10 is used. The table in FIG. 10 represents a relationship between the temperatures of the upper and lower arm elements and the power quantities which are supplied to the respective elements. The table is created beforehand by measuring the temperature of a switching element when a known quantity of power has been supplied to it and stored in a storage unit which is provided in, inter alia, the switching control unit 203.

That is, the switching control unit 203 matches a temperature of a switching element measured by a temperature measurement unit against the table exemplified in FIG. 10 and thereby converts the temperature to a power quantity which is supplied to the switching element. Then, when the obtained power quantity exceeds the threshold, the switching control unit 203 switches between upper and lower arm periods.

Additionally, as for the threshold that is used as a criterion to switch between upper and lower arm periods, an upper arm threshold which is a threshold for the upper arm and a lower arm threshold which is a threshold for the lower arm may be calculated respectively. The cooler or coolers which are installed in the AC-DC conversion circuit 201 do not always cool the upper and lower arms evenly, and a difference may occur between the cooling amounts of the upper and lower arms. For example, in a case where an upper arm cooler to cool the upper arm and a lower arm cooler to cool the lower arm are provided separately and there is a large difference between both coolers in terms of installation positions and performance, a difference occurs between the cooling amounts of the upper and lower arms.

Therefore, the upper arm threshold and the lower arm threshold may be calculated beforehand so that a difference between a value obtained by subtracting a cooling amount from an amount of heat generation in the upper arm and a value obtained by a cooling amount from an amount of heat generation in the lower arm is equal to or less than a predefined value. Using the upper and threshold and the lower arm threshold, switching may be performed between upper and lower arm periods. More specifically, the upper arm threshold and the lower arm threshold are calculated beforehand so that a difference between a value obtained by subtracting the upper arm cooling amount from a power quantity which is supplied to an upper arm element for an upper arm period depending on the integrated value of power and a value obtained by subtracting the lower arm cooling amount from a power quantity which is supplied to a lower arm element for a lower arm period depending on the integrated value of power is equal to or less than the predefined value. Then, when the integrated value of current of the input or output current exceeds the upper arm threshold during an upper arm period, the upper arm period is switched to a lower arm period. When the integrated value of current exceeds the lower arm threshold during a lower arm period, the lower arm period is switched to an upper arm period.

In addition, instead of comparing the integrated value of current of the input or output current with the threshold, at switching timing which is calculated based on the integrated value of power obtained by integrating a power pattern which is set beforehand, switching may be performed between upper and lower arm periods. More specifically, the switching timing is calculated so that a difference between a power quantity which is supped to an upper arm element for an upper arm period depending on the integrated value of power and a power quantity which is supplied to a lower arm element for a lower arm period depending on the integrated value of power is equal to or less than a predefined value.

Figure 11:
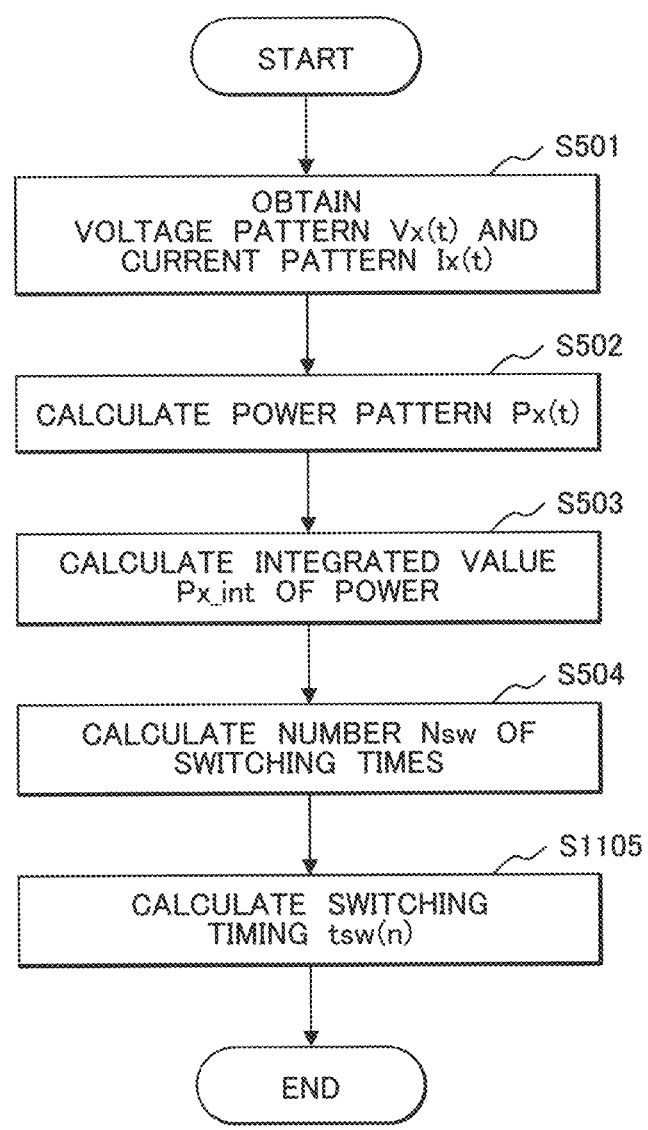
FIG. 11 is a diagram illustrating an example of a processing flow of calculating switching timing in the first embodiment.

An example of a processing flow of calculating switching timing is described with FIG. 11. Now, because steps S501 to S504 are the same as in FIG. 5, their description is omitted and a step S1105 is described.

(S1105)

The switching control unit 203 calculates switching timing tsw(n), using the threshold Px_ref calculated by equation (4). The switching timing tsw(n) is calculated as a time instant at which the integrated value Px_int of power(t) until time t becomes a multiple of the threshold p and corresponds to, e.g., t1, t2, t3, t4 in FIG. 7. Additionally, n is an index of switching between upper and lower arm periods and assumes an integer from 1 to the number Nsw of switching times. In an example of FIG. 7, Nsw=4, tsw(1)=t1, tsw(2)=t3, tsw(3)=t3, and tsw(4)=t4.

Through the above processing flow, switching timing tsw(n) is calculated based on the integrated value of power which is calculated by integrating a power pattern which is set beforehand. Additionally, a computing element other than the switching control unit 203, for example, the X-ray control device 110 or the system control device 124 may execute calculation of switching timing tsw(n).

Figure 12:
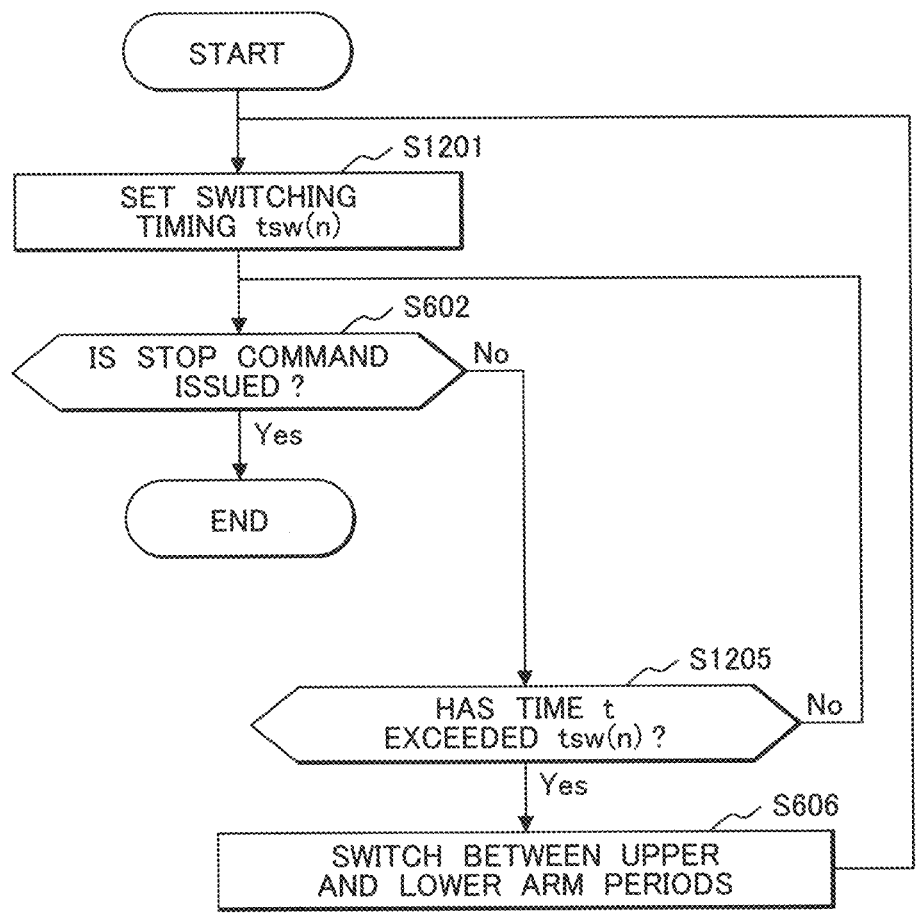
FIG. 12 is a diagram illustrating another example of an operation flow of the power conversion device of the first embodiment.

Another example of an operation flow of the power conversion device 111 of the present embodiment is described with FIG. 12. In FIG. 12, switching is performed between upper and lower arm periods based on the switching timing tsw(n). Now, description of the steps S602 and S606 of the same processing as in FIG. 6 is omitted and steps S1201 and S1205 will be described.

(S1201)

The switching control unit 203 sets the switching timing tsw(n). That is, if this step is executed for the first time, tsw(1) is set, and tsw(n) is updated serially for the second time or later.

(S1205)

The switching control unit 203 decides whether or not time t elapsed from the start of operation of the AC-DC conversion circuit 201 has exceeded the switching timing tsw(n). If time t has exceeded the switching timing tsw(n), the processing proceeds to S606; if not, the processing returns to S602.

Through the processing flow described above, a difference between power which is supplied to an upper arm element for an upper arm period and power which is supplied to a lower arm element for a lower arm period is reduced even when power that is supplied to the load varies greatly or power is supplied in a non-periodic manner; therefore, it is possible to restrain an imbalance in heat generation. In addition, in the operation flow in FIG. 12, the current measurement unit which measures the input current or output current may not be provided.

Second Embodiment

In the first embodiment, a case has been described in which a power conversion device having an AC-DC conversion circuit as a three-phase conversion circuit is provided in the X-ray image capturing apparatus. In the second embodiment, a case will be described in which a power conversion device having a DC-AC conversion circuit as a three-phase conversion circuit is provided in a motor drive device.

Figure 13:
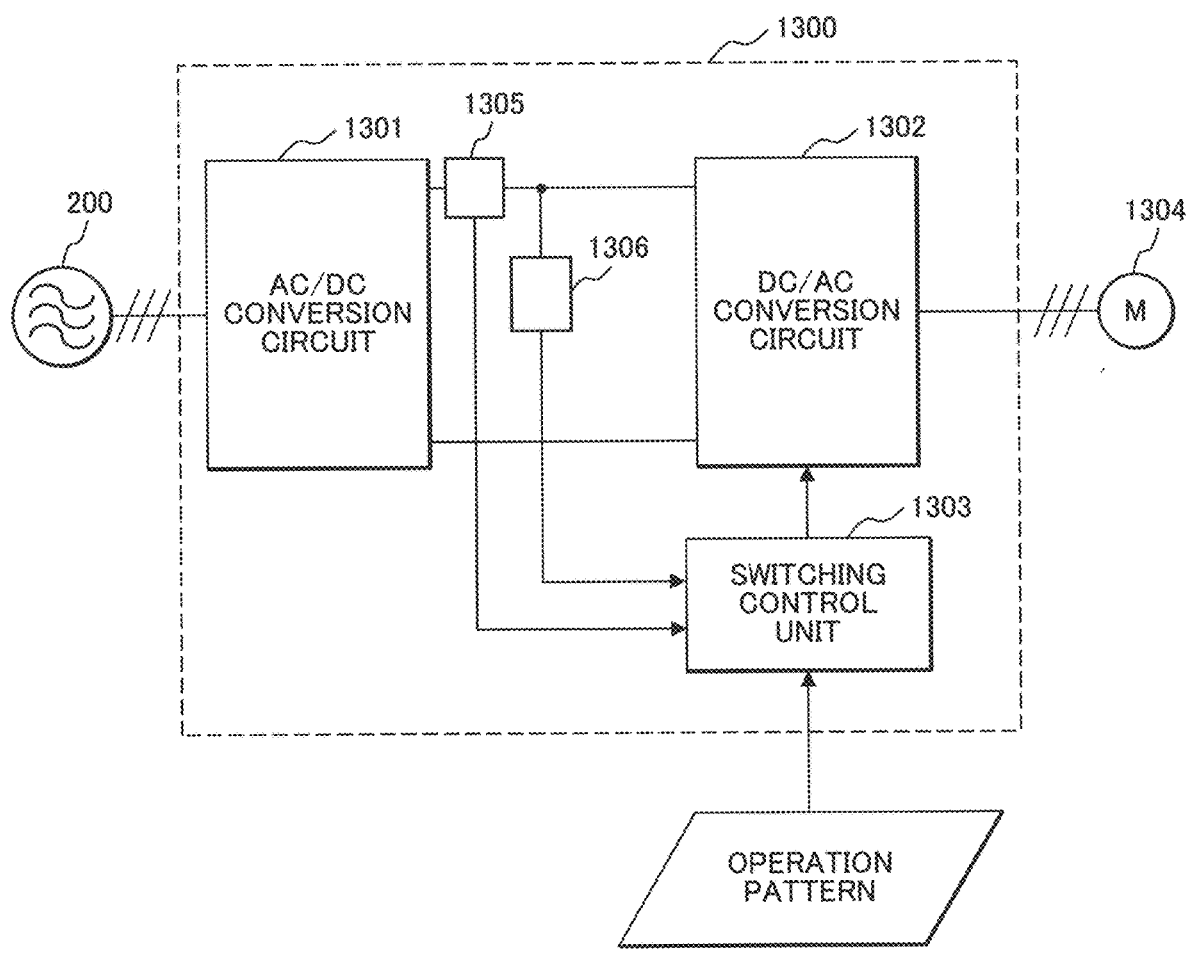
FIG. 13 is a diagram depicting an example of a configuration of a power conversion device of a second embodiment.

An example of a power conversion device 1300 which is provided in a motor drive device to drive a motor 1304 will be described with FIG. 13. The motor 1304 is driven by three-phase power. The power conversion device 1300 includes an AC-DC conversion circuit 1301, a DC-AC conversion circuit 1302, a switching control unit 1303, a current measurement unit 1305, and a voltage measurement unit 1306.

The AC-DC conversion circuit 1301 is a circuit converting three-phase power which is supplied from the utility three-phase power supply 200 to DC power. To an output end of the AC-DC conversion circuit 1301, the DC-AC conversion circuit 1302 is connected. Details of the AC-DC conversion circuit 1301 will be described later by way of FIG. 14A.

The DC-AC conversion circuit 1302 is a circuit converting DC power which is output from the AC-DC conversion circuit 1301 to three-phase power. To an output end of the DC-AC conversion circuit 1302, the motor 1304 which is a load of the power conversion device 1300 is connected. Details of the DC-AC conversion circuit 1302 will be described later by way of FIG. 14B.

The current measurement unit 1305 is a circuit measuring an input current which is a current supplied from the AC-DC conversion circuit 1301 to the DC-AC conversion circuit 1302. Values of the input current measured by the current measurement unit 1305 are transmitted to the switching control unit 1303.

The voltage measurement unit 1306 is a circuit measuring an input voltage which is a voltage applied from the AC-DC conversion circuit 1301 to the DC-AC conversion circuit 1302. Values of the input voltage measured by the voltage measurement unit 1306 are transmitted to the switching control unit 1303.

The switching control unit 1303 is a device which controls switching elements present in the DC-AC conversion circuit 1302 based on a power pattern which is calculated from an operation pattern of the motor 1304, and has a computing element such as, e.g., a Central Processing Unit (CPU). Also, the switching control unit 1303 uses current values which are transmitted from the current measurement unit 1305 and voltage values which are transmitted from the voltage measurement unit 1306, as required, to control the switching elements. Details of operation of the switching control unit 1303 will be described later by way of FIG. 16.

Figure 14A:
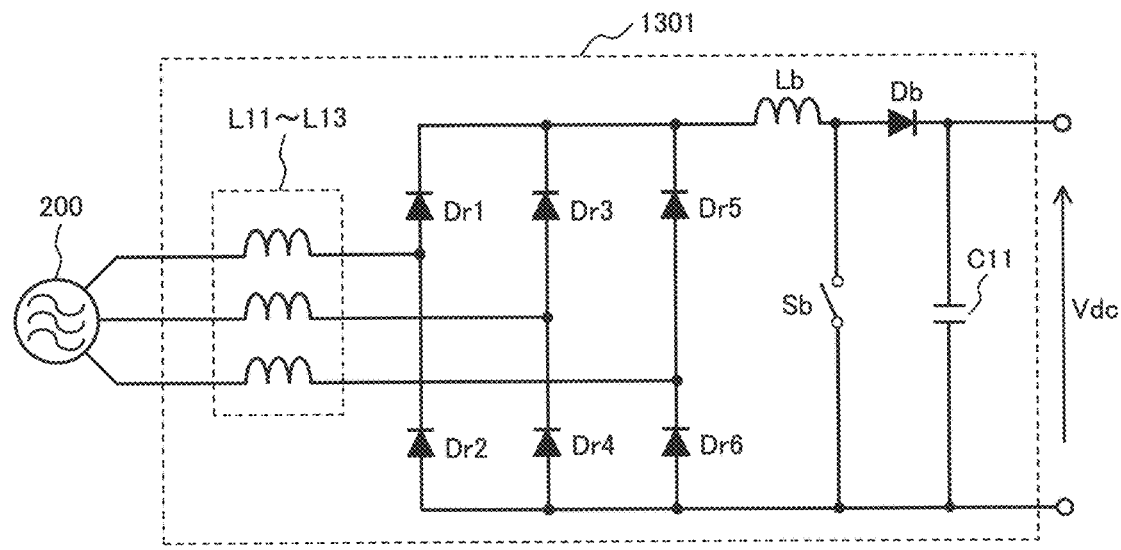
FIG. 14A is a diagram depicting an example of an AC-DC conversion circuit in the second embodiment.

An example of the AC-DC conversion circuit 1301 is described with FIG. 14A. The AC-DC conversion circuit 1301 includes reactors L11 to L13, rectifying diodes Dr1 to Dr6, a boost reactor Lb, a switching element Sb, a diode Db, and a smoothing capacitor C11 and outputs a DC voltage Vdc.

Figure 14B:
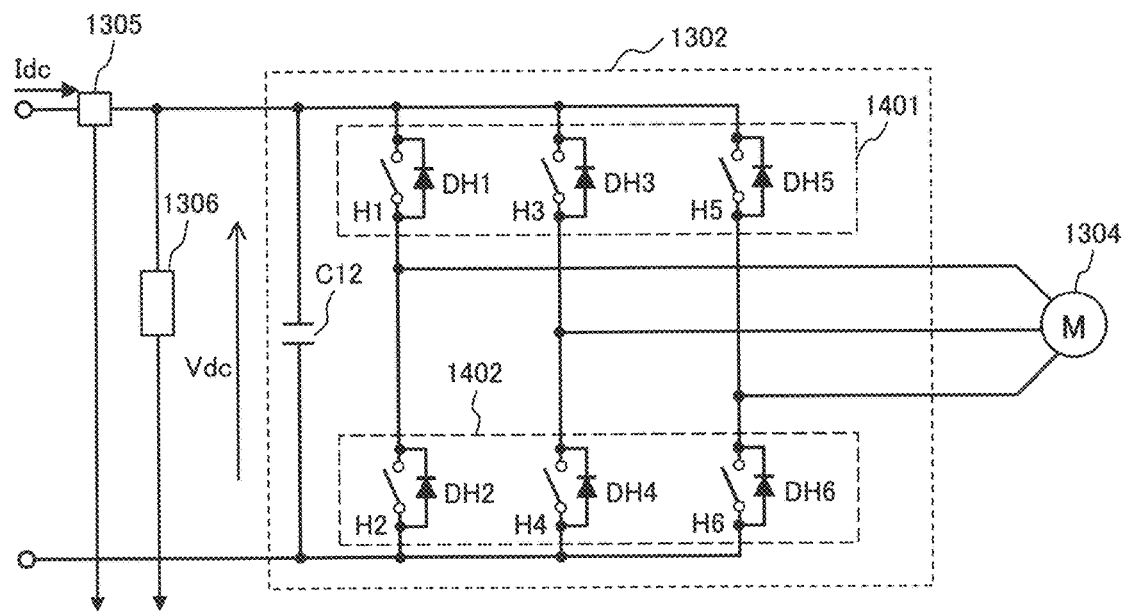
FIG. 14B is a diagram depicting an example of a DC-AC conversion circuit in the second embodiment.

An example of the DC-AC conversion circuit 1302 is described with FIG. 14B. The DC-AC conversion circuit 1302 includes a smoothing capacitor C12, switching elements H1 to H6*m*, and antiparallel diodes DH1 to DH6. The DC-AC conversion circuit 1302 to which a DC current Idc and a DC voltage Vdc are input supplies three-phase power to the motor 1304. The DC current Idc is measured by the current measurement unit 1305, and the DC voltage Vdc is measured by the voltage measurement unit 1306, respectively.

The switching elements H1 to H6 are switches which are ON/OFF controlled by the switching control unit 1303. One of three phases is output from a connection point between the switching elements H1 to H2, a connection point between the switching elements H3 and H4, and a connection point between the switching elements H5 and H6 to the motor 1304, respectively. Also, the switching elements H1, H3, H5 and the antiparallel diodes DH1, DH3, DH5 form an upper arm 1401, and the switching elements H2, H4, H6 and the antiparallel diodes DH2, DH4, DH6 form a lower arm 1402. Moreover, the switching elements H1, H3, H5 included in the upper arm 1401 are upper arm elements, and the switching elements H2, H4, H6 included in the lower arm 1402 are lower arm elements. That is, the DC-AC conversion circuit 1302 is a three-phase conversion circuit in which each of the upper arm elements and each of the lower arm elements are provided for each of the three phases.

Figure 15:
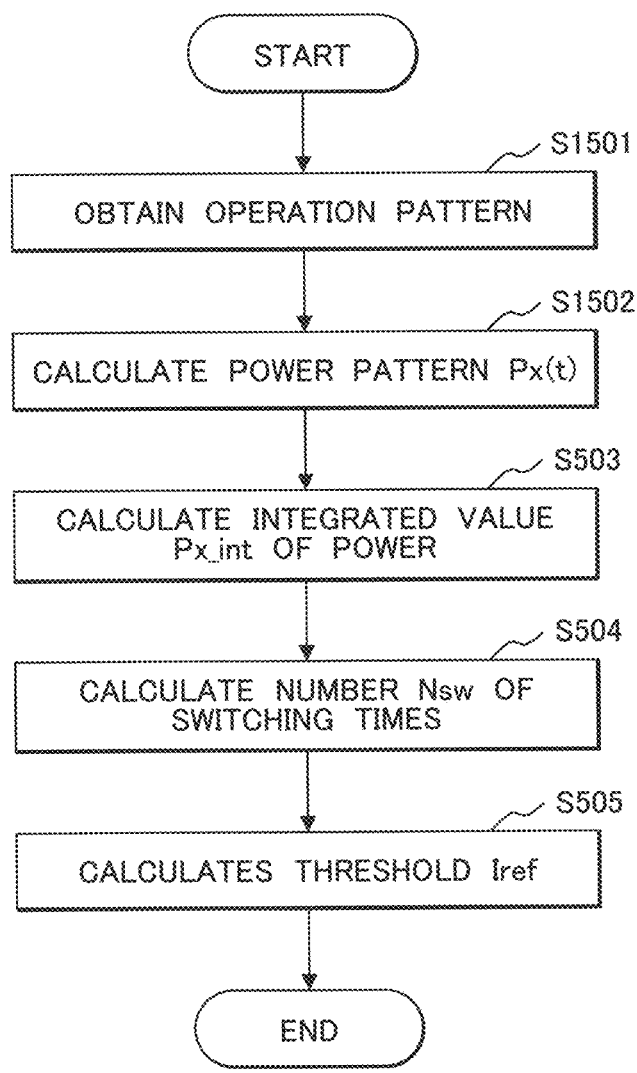
FIG. 15 is a diagram illustrating an example of a processing flow of calculating a threshold in the second embodiment.

An example of a processing flow of calculating a threshold that is used as a criterion to switch between upper and lower arm periods based on an operation pattern of the motor 1304 which is set beforehand will be described with FIG. 15. Now, because steps S503 to S505 are the same as in FIG. 5, their description is omitted and steps S1501 and S1502 will be described.

(S1501)

The switching control unit 1303 obtains an operation pattern of the motor 1304. In the operation pattern, for example, the following are included: a torque pattern T(t) and a rotating speed pattern N(t) which are temporal change patterns of torque (N·m) and rotating speed (r/min) of the motor 1304.

(S1502)

The switching control unit 1303 calculates a power pattern Px(t), using the torque pattern T(t) and the rotating speed pattern N(t) obtained at S1501. To calculate the power pattern Px(t), for example, an equation below is used.

$$Px(t)=2\pi \times T(t) \times N(t)/60 \qquad (7)$$

Additionally, to calculate the threshold Iref at step S505, for example, an equation below is used instead of the equation (5).

$$Iref=Px\_ref/Vdc\_ref \qquad (8)$$

where Vdc_ref is a reference value of the DC voltage Vdc.

Through the above processing flow, thresholds such as the threshold Px_ref of power and the threshold Iref regarding the input current are calculated. Additionally, a computing element other than the switching control unit 303, for example, a computing element with which an external device is equipped may execute calculation of the thresholds.

Figure 16:
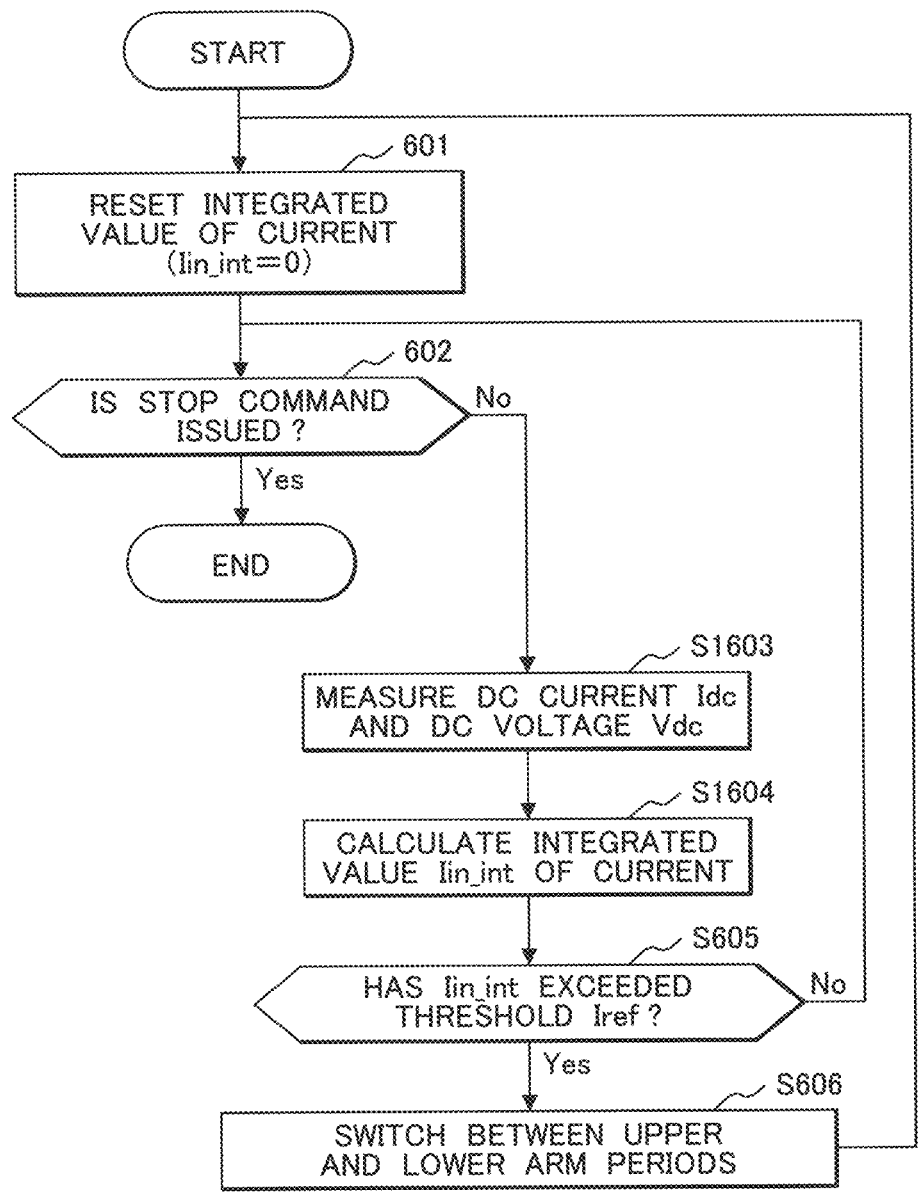
FIG. 16 is a diagram illustrating an example of an operation flow of the power conversion device of the second embodiment.

An example of an operation flow of the power conversion device 1300 of the present embodiment is described with FIG. 16. Now, in FIG. 16, switching between upper and lower arm periods is performed based on the threshold Iref regarding the input current. Now, description of the steps S601, S602, S605, and S606 of the same processing as in FIG. 6 is omitted and steps S1603 and S1604 will be described.

(S1603)

The current measurement unit 1305 and the voltage measurement unit 1306 measure the DC current Idc and the DC voltage Vdc respectively which are input from the AC-DC conversion circuit 1301 to the DC-AC conversion circuit 1302. Measured values of the DC current Idc and of the DC voltage Vdc are transmitted to the switching control unit 1303.

(S1604)

The switching control unit 1303 integrates the DC current Idc and calculates an integrated value Iin_int of current. In calculating the integrated value Iin_int of current, values of the DC current Idc are used which have been measured after the reset of the integrated value of current at step S601 until this step. To calculate the integrated value Iin_int of current, for example, an equation below is used.

$$Iin\_int = (Vdc/Vdc\_ref) \int Idc \cdot dt \qquad (9)$$

In equation (9), Vdc/Vdc_ref is a correction coefficient when a value of the DC voltage Vdc is varied. By being multiplied by the correction coefficient, it is possible to reduce a difference in loss even when a value of the DC voltage Vdc is varied depending on the operation pattern of the motor 1304.

Through the processing flow described above, a difference between power which is supplied to an upper arm element for an upper arm period and power which is supplied to a lower arm element for a lower arm period is reduced even when power that is supplied to the load varies greatly or power is supplied in a non-periodic manner; therefore, it is possible to restrain an imbalance in heat generation.

Now, the power conversion device, the X-ray image capturing apparatus, and the motor drive device of the present invention are not limited to the foregoing embodiments, and it is possible to modify and embody their components without departing from the scope of the invention. Also, multiple components disclosed in the foregoing embodiments may be combined as appropriate. Moreover, some components may be removed from all components set forth in the foregoing embodiments.

REFERENCE SIGNS LIST

1: X-ray CT apparatus, 10: subject, 100: scanning gantry part, 101: X-ray tube device, 102: rotating ring, 103: collimator, 104: bore, 105: bed device, 106: X-ray detector, 107: data acquisition device, 108: gantry control device, 109: bed control device, 110: X-ray control device, 111: power conversion device, 120: operating unit, 121: input device, 122: image processing device, 123: storage device, 124: system control device, 125: display device, 200: three-phase power supply, 201: AC-DC conversion circuit, 202: DC-DC conversion circuit, 203: switching control unit, 204: current measurement unit, 301: upper arm, 302: lower arm, 1300: power conversion device, 1301: AC-DC conversion circuit, 1302: DC-AC conversion circuit, 1303: switching control unit, 1304: motor, 1305: current measurement unit, 1306: voltage measurement unit, 1401: upper arm, 1402: lower arm

What is claimed is:

1. A power conversion device comprising:
   a three-phase conversion circuit in which each of upper arm elements which are switching elements in an upper arm and each of lower arm elements which are switching elements in a lower arm are provided for each of three phases; and
   a switching control unit which alternately switches between an upper arm period of holding one of the upper arm elements ON and a lower arm period of holding one of the lower arm elements ON,
   wherein the switching control unit switches between the upper arm period and the lower arm period, based on an integrated value of power which is calculated by integrating a power pattern which is set beforehand.

2. The power conversion device according to claim 1, wherein the switching control unit switches between the upper arm period and the lower arm period so that a difference between a power quantity which is supplied to one of the upper arm elements for the upper arm period depending on the integrated value of power and a power quantity which is supplied to one of the lower arm elements for the lower arm period depending on the integrated value of power is equal to or less than a predefined value.

3. The power conversion device according to claim 2, further comprising a current measurement unit which measures an input current which is a current input to the three-phase conversion circuit or an output current which is a current output from the three-phase conversion circuit,
   wherein the switching control unit calculates beforehand a threshold so that the difference is equal to or less than the predefined value and switches between the upper arm period and the lower arm period when an integrated value of the input current or an integrated value of the output current exceeds the threshold.

4. The power conversion device according to claim 3, further comprising a voltage measurement unit which measures a value of a voltage which is applied to the three-phase conversion circuit,
   wherein the switching control unit calculates a correction coefficient by which the integrated value is multiplied depending on a voltage value measured by the voltage measurement unit and switches between the upper arm period and the lower arm period when a product of the correction coefficient and the integrated value exceeds the threshold.

5. The power conversion device according to claim 2, wherein the predefined value is zero.

6. The power conversion device according to claim 2, wherein the switching control unit calculates beforehand a switching timing when the difference becomes equal to or less than the predefined value and switches between the upper arm period and the lower arm period when time passes beyond the switching timing.

7. The power conversion device according to claim 2, further comprising:
   temperature measurement units which measure a temperature of the upper arm elements and a temperature of the lower arm elements; and
   a storage unit in which a table representing a relationship between the temperatures and power quantities is stored,
   wherein the switching control unit calculates beforehand a threshold so that the difference is equal to or less than the predefined value and switches between the upper arm period and the lower arm period when a power quantity obtained by matching a temperature measured by the temperature measurement units against the table exceeds the threshold.

8. The power conversion device according to claim 1, further comprising:
   an upper arm cooler to cool the upper arm;
   a lower arm cooler to cool the lower arm; and
   a current measurement unit which measures a value of an input current which is a current input to the three-phase conversion circuit or a value of an output current which is a current output from the three-phase conversion circuit,
   wherein the switching control unit calculates beforehand an upper arm threshold which is a threshold for the upper arm and a lower arm threshold which is a threshold for the lower arm so that a difference between a value obtained by subtracting a cooling amount of the upper arm cooler from a power quantity which is supplied to one of the upper arm elements for the upper arm period depending on an integrated value of power which is calculated by integrating the power pattern and a value obtained by subtracting a cooling amount of the lower arm cooler from a power quantity which is supplied to one of the lower arm elements for the lower arm period depending on the integrated value of power is equal to or less than a predefined value, and performs switching from the upper arm period to the lower arm period when an integrated value of the input current or an integrated value of the output current exceeds the upper arm threshold during the upper arm period and switching from the lower arm period to the upper arm period when the integrated value of the input current or the integrated value of the output current exceeds the lower arm threshold during the lower arm period.

9. The power conversion device according to claim 1, wherein the three-phase conversion circuit is an AC-DC conversion circuit in which three-phase power is input to each connection point between each of the upper arm elements and each of the lower arm elements and which outputs DC power.

10. The power conversion device according to claim 1, wherein the three-phase conversion circuit is a DC-AC conversion circuit to which DC power is input and which outputs three-phase power from each connection point between each of the upper arm elements and each of the lower arm elements.

* * * * *